UNITED STATES PATENT OFFICE.

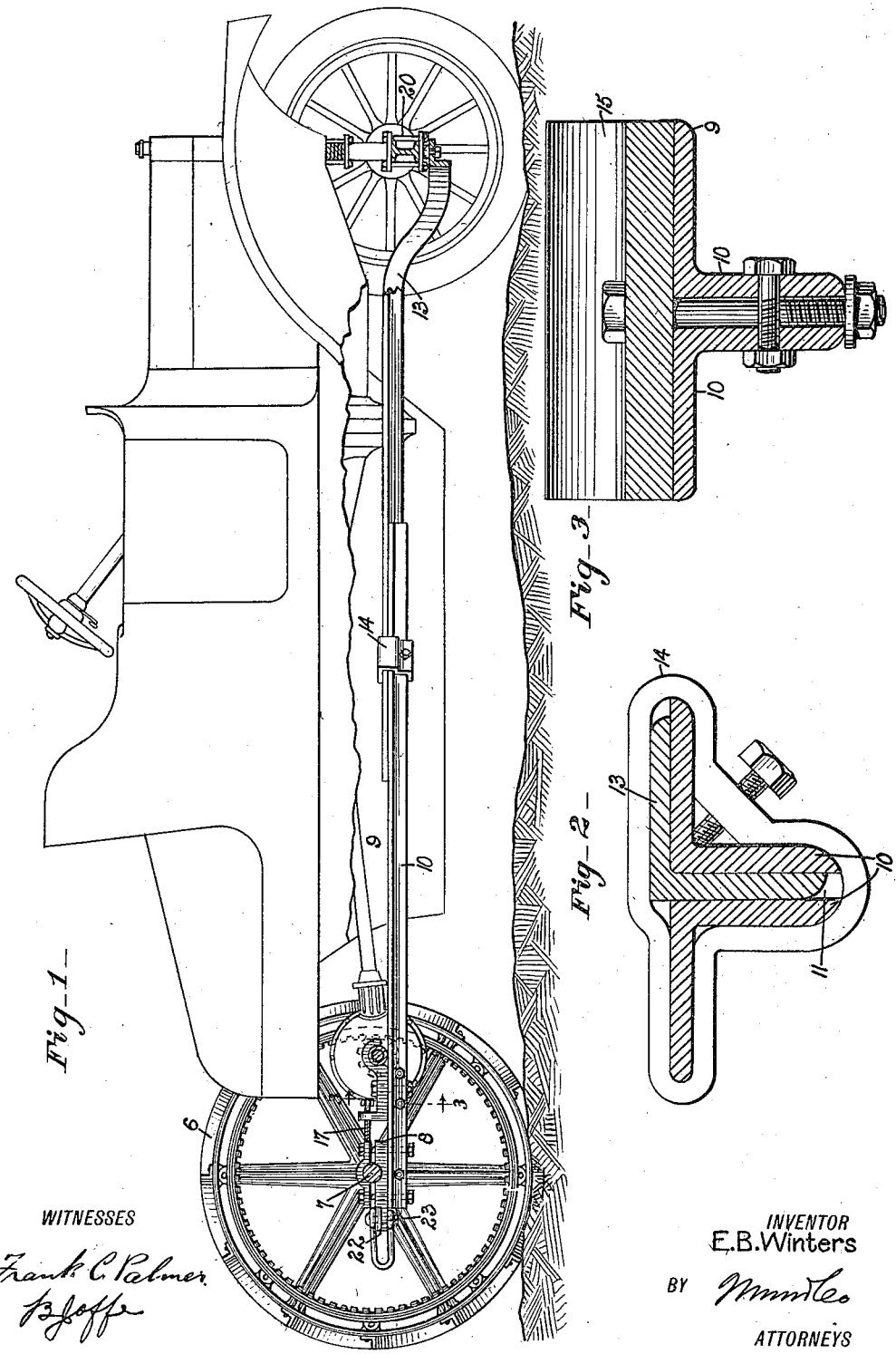

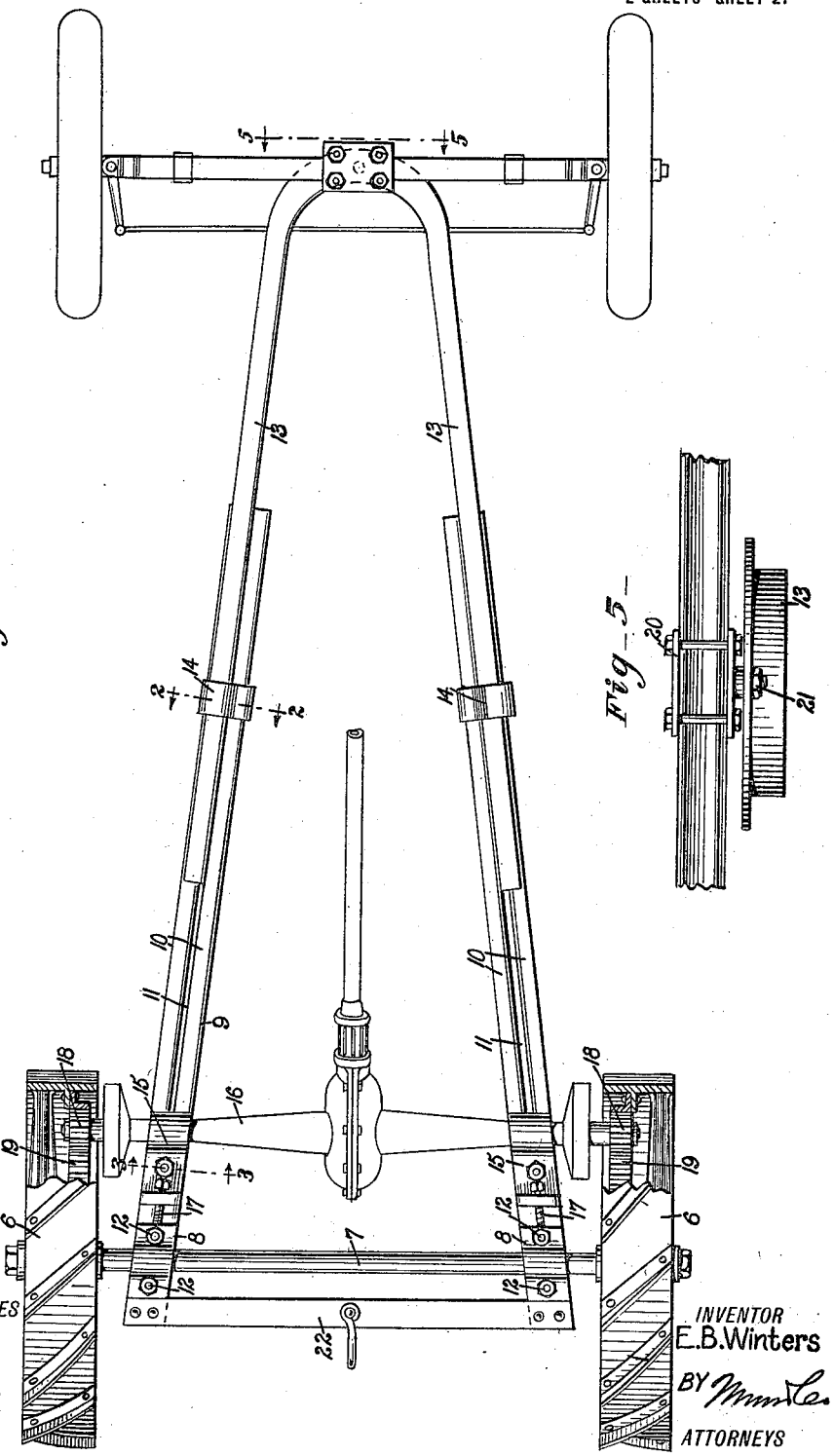

EDWARD BLOUNT WINTERS, OF COFFEYVILLE, KANSAS.

TRACTOR ATTACHMENT FOR AUTOMOBILES.

1,274,968.   Specification of Letters Patent.   Patented Aug. 6, 1918.

Application filed May 18, 1917. Serial No. 169,392.

*To all whom it may concern:*

Be it known that I, EDWARD B. WINTERS, a citizen of the United States, and a resident of Coffeyville, in the county of Montgomery and State of Kansas, have invented a new and Improved Tractor Attachment for Automobiles, of which the following is a full, clear, and exact description.

My invention relates to an attachment for automobiles whereby the same can be easily and quickly transformed into a tractor.

An object of the invention is to provide a simple, inexpensive and efficient contrivance which can be easily and quickly secured to an automobile without interfering with any part of the automobile body so as to mar it in any way, nor is it necessary, to secure the attachment, to get under the car when attaching or detaching the contrivance.

Another object of the invention is to provide an attachment having an extensible frame, so that the same can be easily adapted for cars of various sizes.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is a side elevation of a car provided with my tractor attachment, certain parts of the car being broken out to show the details of construction;

Fig. 2 is a cross section on line 2—2, Fig. 4;

Fig. 3 is a cross section on line 3—3, Fig. 4;

Fig. 4 is a plan view of the tractor attachment as secured to the front and rear wheel of the vehicle; and Fig. 5 is an elevation on line 5—5, Fig. 4.

Referring to the drawings, 6 6 are the traction wheels mounted on an axle 7 which is mounted in bearings 8 supported on the sides in proximity to the base of a triangular frame 9. The sides of the frame are preferably formed of pairs of corner irons 10 spaced from each other to provide a channel 11 to accommodate the bolts 12 which lock the bearings to the frame. The same channels 11 accommodate extensions 13 of the triangular frame 9. The extensions may be locked to the sides of the frame by clamps 14. In cases where the frame is to be extended or shortened considerably the extension 13 is formed of two pieces hinged at the apex. When the extension or shortening is to be only a few inches the extension 13 is formed of a single piece.

Each of the channels 11 accommodates a clamp 15 which has means for gripping the rear axle 16 of an automobile and therefore secure the same to the frame. The clamps are provided with screws 17 which abut against the bearings 8 of the tractor axle 7, whereby the distance between the tractor axle and the rear axle of the car may be varied and thereby a larger or smaller pinion 18 brought into mesh with a corresponding gear 19 in the tractor wheels, the pinion 18 taking the place of the rear wheels. To secure the frame to the front axle the same is provided with a detachable yoke 20 to which the extension 13 of the frame 9 is securable by a depending bolt 21, or any other suitable means.

To attach the contrivance the rear wheels and the fenders of the car are removed. The pinions 18 are then substituted for the wheels on the rear axle; the frame is moved under the car; the front of the frame is secured to the front axle by the bolt 21; and the rear axle is secured to the frame by the clamps 15. The clamps are previously adjusted so as to bring the pinions 18 into mesh with the gears 19 within the tractor wheels. It will be noted that the securing of the rear axle and the frame to the front axle in no way affects the springs or chassis of the car. It leaves all the operating mechanisms of the car axles unaffected. The base 22 of the triangular frame which forms the draw bar of the tractor is secured to the extensions 23 of the bearings 8. This throws all the draft on the axle 7 of the tractor and, therefore, does not tend to crowd the axle toward the rear axle 16 of the motor car.

In cases where an adjustment of the tractor frame is necessary the set screws on the clamps 14 are released so as to permit the movement of the extensions 13 of the frame 9 to obtain the desired length. To detach the contrivance it is only necessary to release the clamps 15 from the rear axle 16 of the car and detach the extension 13 from the front axle of the car. The pinions can then be removed from the rear wheels and the frame pulled out from under the car bed and the rear wheel substituted in place of the pinions. It will be remarked that the attaching and detaching of the tractor frame does not require the operator to get under the car for the purpose.

I claim:

1. A tractor attachment for automobiles comprising,—a frame having channeled sides, an extension movable in said channeled sides, means for securing the extension to the channeled sides whereby the length of the frame may be varied, bearings near the rear end of the frame, means engaging the channels of the frame adapted to secure the bearings to the frame, an axle in said bearings, tractor wheels on said axle, a draw bar connecting said bearings, clamps for securing the rear axle of an automobile to the frame, means for securing the clamps engaging the channeled sides of the frame, gears associated with the tractor wheels, pinions adapted to be secured to the rear axle of an automobile in place of the rear wheel and adapted to mesh with the gears, and means for securing the front end of the frame to the front axle of the automobile.

2. A tractor attachment for automobiles comprising,—a triangular frame having channeled sides through a part of its length, an extension movable in said channeled sides, means for securing the extension to the channeled sides whereby the length of the frame may be varied, bearings near the rear end of the frame, a draw bar connecting the bearings, an axle in said bearings, tractor wheels on said axle, clamps for securing the rear axle of an automobile to the frame, means associated with said clamps and engaging the bearings, whereby the distance between the tractor axle and that of the automobile may be adjusted, gears associated with the tractor wheels, pinions adapted to be secured to the rear axle of an automobile in place of the rear wheels, said pinions being adapted to mesh with the gears in the tractor wheels, and means for securing the front end of the frame to the front axle of the automobile.

EDWARD BLOUNT WINTERS.

Copies of this patent may be obtained for five cents each, by addressing the "Commissioner of Patents, Washington, D. C."